US006198750B1

United States Patent
Buchholz et al.

(10) Patent No.: US 6,198,750 B1
(45) Date of Patent: Mar. 6, 2001

(54) ATM ACCESS INTERFACE: HARDWARE BASED QUICK RESPONSE FLOW CONTROL

(75) Inventors: D. Bruce Buchholz, Woodridge; Charles Calvin Byers, Aurora; James Stavert Loos, Lisle; James Philip Runyon, Wheaton; Hsien-Chuen Yu, Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/042,833

(22) Filed: Mar. 17, 1998

(51) Int. Cl.[7] .............................. H04L 12/66; H04L 12/56
(52) U.S. Cl. ......................... 370/463; 370/412; 370/229; 370/395
(58) Field of Search .................................... 370/229–236, 370/412–416, 395, 252, 463, 389, 465, 450, 443, 444

(56) References Cited

U.S. PATENT DOCUMENTS 5,696,764 * 12/1997 Soumiya et al. ..................... 370/395
5,742,765 * 4/1998 Wong et al. .......................... 370/465
6,122,279 * 9/2000 Milway et al. ....................... 370/395

* cited by examiner

*Primary Examiner*—Wellington Chin
*Assistant Examiner*—Maikhanh Tran
(74) *Attorney, Agent, or Firm*—Werner Ulrich

(57) ABSTRACT

An arrangement for concentrating broadband data from a plurality of CPEs (customer premises equipments) for transmission over a link to an ATM network. Because each CPE can generate data at the full rate of the link, it is necessary to detect peaks of bursty traffic from a CPE user quickly and to limit the rate of data transmission whenever the capacity of the link may be exceeded. This is accomplished first by allowing the transmission of certain classes of traffic (lower priority) only when a token to permit transmission has been accumulated in the CPE, and second, by having a FIFO buffer for each user and detecting whenever the FIFO buffer has accumulated more than n cells; when this condition is detected, no more tokens are sent back to the user. The user is not allowed to accumulate more than m tokens. Advantageously, this arrangement allows essentially the full bandwidth of the link to the ATM network to be utilized by a timely throttling of bursts of traffic when they cannot be accommodated.

5 Claims, 1 Drawing Sheet

ATM ACCESS INTERFACE: HARDWARE BASED QUICK RESPONSE FLOW CONTROL

TECHNICAL FIELD

This invention relates to arrangements for controlling the flow of data traffic between users and a broad band data network.

PROBLEM

In a typical modern broad band data network, a plurality of users share a single high speed link to a broad band network, such as a broad band asynchronous transfer mode (ATM) network. Such network links are capable of accepting data rates as high as, for example, 155 megabits per second. A data concentrator, sometimes referred to as an access interface, is use to connect the multiplicity of users to a single 155 megabit per second network link. It is well known that data traffic is frequently very bursty, i.e., has very high data rate peaks whose magnitude far exceeds the average data rate of a user. To effectively use the bandwidth of the network link many users must be connected, through the access interface, to the network link. The data rate of the link between each user and the access interface can be as high as the data rate of the network link, 155 megabits per second, provided a means exists to handle periods of congestion, i.e., times when multiple users attempt to simultaneously send high bandwidths of data to the network for extended periods of time.

A modern broad band data network must be capable of handling real time data that is delay sensitive such as data representing speech, as well as data for which delay, although undesirable, can be tolerated to a greater extent, such as FAX, Internet web access, still video, and file system transfers. The method of handling periods of congestion must not introduce excessive delay in delay sensitive data.

The ATM standards provide a mechanism for limiting the flow of data from the user into the ATM network. Each user continuously sends and receives a complete 155 megabits per second or other standard data rate. When the user is idle, i.e., has no data to send, all the cells sent to the network are idle cells; when the user is transmitting at peak capacity, all of the cells are active. Usually, only a moderate fraction of the cells, that are transmitted from any one user, are active. A flow control mechanism for active cells transmitted to the network is provided by the standard through the use of tokens transmitted to the user via generic flow control (GFC) bits, sometimes referred to as the GFC field, contained in the ATM header, of each transmitted cell. When the flow control mechanism is invoked, a user may transmit an active cell only if that user has an available token. Tokens are transmitted to users in cells received by the users; if the network cannot accept more than a certain rate of active cells, the network will transmit to the user only enough tokens to allow that many cells to be transmitted.

A number of problems exist in the prior art. First, the mechanism for detecting that traffic into the network should be throttled by limiting the number of tokens is slow compared to the build up rate of bursty data traffic. Second, although it is possible to give transmission priority to cells containing high priority data, such as data representing speech or control cells, when the cells arrive at an ATM interface, a large number of low priority cells may already be in the pipeline and cause the high priority cells to be delayed; a problem know as "head of line blocking". Both of these problems can be overcome at the access interface by the use of very large multiple priority data buffers to store all data and grant it access according to priority, the dropping of data cells, and/or the use of traffic projection algorithms that limit the aggregate of the peak traffic rates from all the users or limit the number of users connected to an ATM access interface. Such solutions, however, are undesirable and/or uneconomical.

In summary, a problem in the prior art is that there is no satisfactory arrangement for responding rapidly to bursty data traffic into the network by throttling that traffic before excessive queues are formed in the ATM access interface, and further for insuring the timely transmission of high priority data traffic, such as data representing speech, or data demanding immediate delivery, such as a stock purchase or sale request.

SOLUTION

The above problems are solved, and an advance is made over the teachings of the prior art in accordance with our invention wherein a first-in-first-out (FIFO) queue is connected to each user that is connected to the ATM access interface, and wherein a token is returned to that user only if its FIFO has fewer than n cells, and wherein the number of tokens that a user can accumulate is limited to m. With this arrangement, if its FIFO is not being emptied rapidly enough, the supply of tokens available to the user connected to that FIFO will be rapidly depleted. In Applicants' preferred embodiment, n and m, each of which can be set independently, are limited to either one or two. Advantageously, this allows for a very rapid detection of and response to overload. In Applicants' preferred embodiment, electronic circuit means are used to detect whether the FIFO contains more than n cells, and these circuit means are used to directly suspend the generation of further tokens by inserting the proper value in the standard ATM generic flow control (GFC) bits that are sent with each cell transmitted to the user.

In accordance with one feature of Applicants' invention, when a high priority cell, as defined by data in the GFC field of the transmitted cell, is received at the ATM access interface, this cell is sent to a different FIFO, a FIFO for receiving and storing high priority cells. The high priority FIFO is given preferential treatment over other FIFOs either by being polled more often for transmission of a cell into the ATM network or by being given absolute preference over the other, low priority, FIFOs. Only the low priority FIFO is tested to detect whether a token should be transmitted to the user. On the user side, high priority cells may be transmitted without requiring a token.

DETAILED DESCRIPTION

Figure 1:
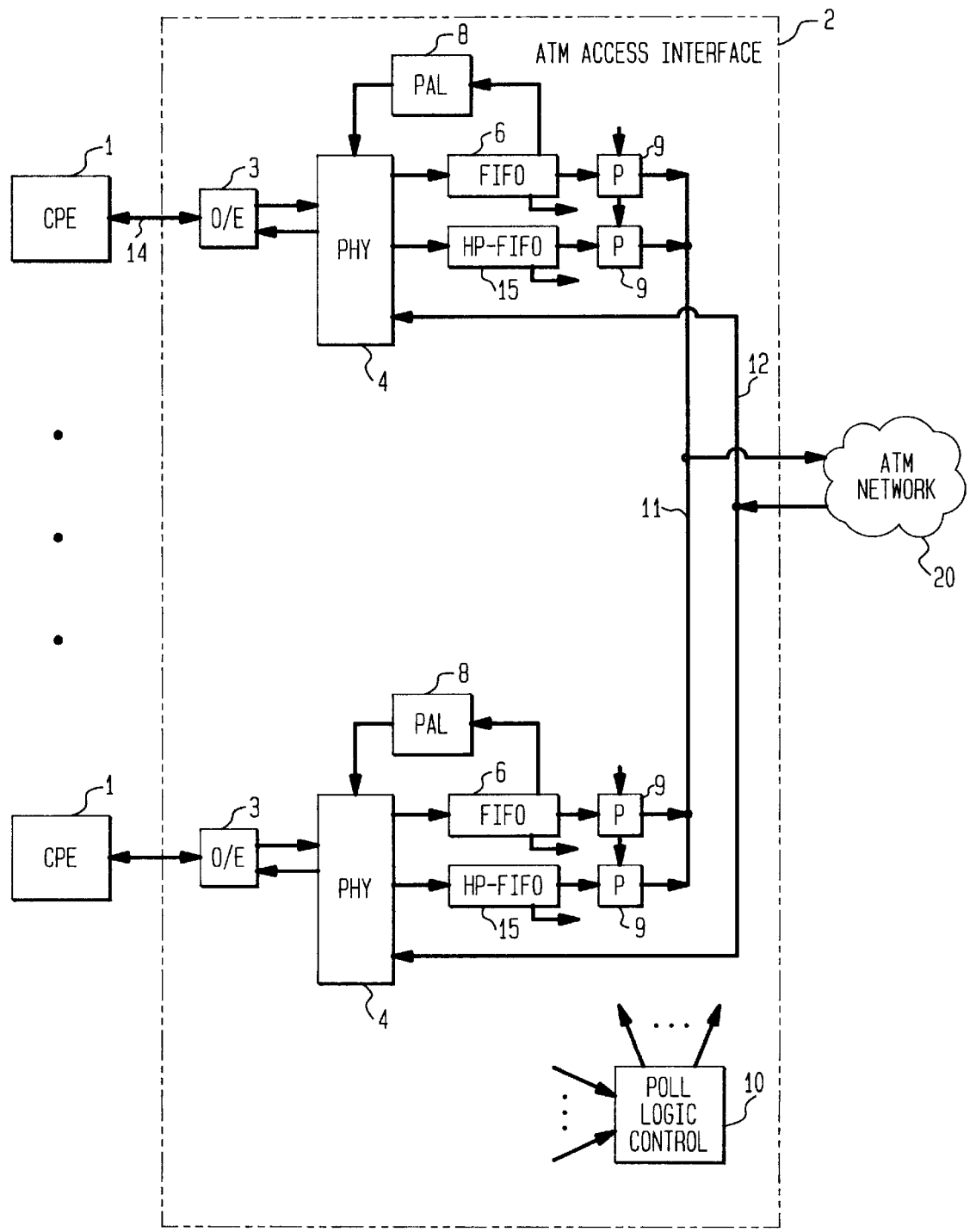
FIG. 1 is a block diagram of an ATM access interface illustrating the operation of Applicants' invention.

FIG. 1 is a block diagram illustrating the operation of Applicants' invention. A plurality of customer premise equipments (CPEs) 1, is connected through an ATM access interface 2 to a broad band ATM network 20. Each of the CPEs 1 transmits and receives at a full standard data rate, such as 155 megabits per second, transmitting or receiving idle cells whenever there is no active data to be transmitted or received. The link 14 between the CPE and the ATM access interface 2, sometimes referred to as the physical link, in this embodiment, is an optical link terminated at an optical electrical (O/E) interface 3. Interface 3 converts between the optical signals of the link and the electrical signals used within the interface 2. Each O/E interface 3 is connected to a physical layer interface 4 for assembling ATM cells for delivery to FIFO unit 6, a high priority FIFO unit 15. The physical layer interface discards idle cells so they are not transmitted to the FIFO 6. In Applicants' preferred embodiment, the physical layer unit (PHY) 4 distinguishes between high priority and ordinary cells, and sends the high priority cells to high priority FIFO 15. The outputs of each FIFO is connected via a polling device 9 to a UTOPIA bus 11. The polling devices 9 are controlled by polling control logic 10 which receives inputs from all the FIFOs indicating which FIFOs have cells available, and has outputs to all of the polling devices to select which FIFO should transmit a cell to the UTOPIA bus 11. The UTOPIA bus 11 is connected through appropriate interface equipment (not shown, but well known in the prior art), to the broad band ATM network 20. Data received from the ATM network 20 is routed over a second UTOPIA bus 12 through the appropriate interface equipment (not shown) directly to the physical layer interface 4. The physical layer interface 4 generates idle cells when there are no cells to be transmitted to the CPE 1.

The physical layer interface 4 writes the GFC field into the ATM cells transmitted to the CPE, just prior to transmission over the physical link. Therefore, there is less than a one cell delay between the time when a new GFC bit pattern is established and the time when cells with the new bit pattern are transmitted out over the physical link. Hardware logic, such as programmed array logic unit 8 connected to FIFO 6 detects when FIFO 6 contains more than n cells. When more than n cells are detected in FIFO 6 by the hardware logic unit 8, the same hardware logic unit 8 suspends the transmission of further tokens to the CPE by inserting the proper data into the GFC field of the cells transmitted to CPE 1. This arrangement permits a very rapid response to the detection of overload; as soon as a FIFO is not emptied of all but n cells, the generation of new tokens is suspended with a time delay of less than one cell. The CPE itself maintains only 1 or 2 tokens. In a 1 km long fiber link operating at 155 megabit per second there may be up to 2 tokens in transit to the CPE on the physical link between the ATM access interface and the CPE and up to 2 cells in transit to the access interface on the physical link. For such a case, the net result is that the total number of tokens which are available to the CPE in case of high overload is approximately 5 and the total number of cells to arrive at the FIFO after congestion is detected is approximately 7. If n is set to 2 cells, each FIFO need only to have a depth of 9 cells, i.e., 3816 bits. Each additional 1 km of fiber in the link will add an additional 4 cells to the FIFO depth requirement; however, even a 5 km long physical link will still require only a 17 cell, i.e. 7208 bit, FIFO depth. For a collection of 100 links, 5 km long, operating at 155 megabit per second the total buffer needed is still less than 1 megabit. Note that in sizing the FIFO, the fact that data is being emptied from the FIFO during the time it is being filled has not been taken into account, so the buffer size represents an upper limit.

The use of FIFO buffers introduces a delay or latency to the data transfer. To have an acceptable quality of service, the latency of voice traffic should be less than 2 milliseconds (msec) for connections without echo cancellation and less than 90 msec for connections with echo cancellation. For an access interface that concentrates 50 links, 1 km long, running at 155 megabit per second, to a single 155 megabit per second link into the network, the access interface will introduce a latency of 1.25 msec to voice traffic under worst case conditions if a single buffer is used for both high and low priority traffic. (A 155 megabit per second link will empty cells at a rate of $3.66 \times 10^5$ cells per second [1424 bits per cell]. Under worst case conditions all 50 FIFOs will be congested and contain 9 cells. To empty all 450 cells at 155 megabits per second requires 1.25 msec.) Longer links between the user and the access interface and/or higher degrees of concentration at the access interface will result in the introduction of greater latency to voice traffic when a single FIFO is used for both high and low priority traffic. When separate FIFOs are used for the high and low priority traffic, the only factor that affects the latency of high priority traffic at the access interface is the degree of concentration for high priority traffic, i.e., the rate at which high priority cells arrive. The link length is no longer a concern; head of line blocking by low priority cells is avoided by sending them to the low priority FIFO until the GFC flow control mechanism can suspend their transmission. If absolute preference is given to the high priority FIFOs the number of cells in the low priority FIFOs will not affect the latency of high priority traffic. A voice link will typically transmit no more than 1 ATM cell every 0.5 msec (4 bytes of voice data per ATM cell) and often considerably less frequently. If a voice rate of 1 ATM cell every 0.5 msec is assumed, the access interface can concentrate up to 180 voice channels, of any link length, to a single 155 megabit per second network link, when both high and low priority FIFOs are used. If more bytes of voice data are packed per ATM cell even greater degrees of concentration can be realized at the access interface. The use of the GFC field to control the flow of low priority traffic means that the low priority cells sent to the access interface will have a different GFC field than the high priority cells; hence, a simple way to separate the ATM cells between the high and low priority FIFO is by the value of the GFC field.

The above description is of one preferred embodiment of Applicants' invention. Many other embodiments will be apparent to those of ordinary skill in the art. The invention is only limited by the attached Claims.

What is claimed is:

1. An ATM access interface for interfacing between a plurality of customer premise equipment (CPE) and an ATM network comprising:

a physical layer interface for interfacing to the customer premise equipment;

a FIFO connected to said physical interface for receiving cells from said physical interface; and a hardware logic unit receiving an input from said FIFO and delivering a control signal to said physical interface;

said input from said FIFO representing a signal indicating whether more than n cells are currently stored in said FIFO;

said hardware logic unit responsive to said signal from said FIFO for generating a control signal to cause said physical layer to insert the proper generic flow control bits into cells being transmitted from the physical network interface to the connected CPEs in order to suspend forming new tokens at the connected CPE if more than n cells are currently stored in said FIFO;

said CPE responsive to receipt of tokens to accumulate up to m tokens and to transmit only one accumulated cell for each token accumulated by a CPE.

2. The apparatus of claim 1 further comprising a high priority FIFO;

wherein said physical layer unit detects high priority cells and transmits the high priority cells to said high priority FIFO; and said high priority FIFO is given preference over other normal priority FIFOs in being given access to said ATM network.

3. The apparatus of claim 2 wherein high priority cells have a GFC (Generic Flow Control) field different from a GFC field of low priority cells; and wherein said physical layer unit detects a high priority cell by testing a GFC field of an incoming cell.

4. The apparatus of claim 1 wherein said CPE's transmit accumulated high priority cells without requiring availability of an accumulated token.

5. The apparatus of claim 1 wherein $1 \leq n \leq 2$ and $1 \leq m \leq 2$.

* * * * *